United States Patent
Pilozzi et al.

(10) Patent No.: US 6,456,651 B1
(45) Date of Patent: Sep. 24, 2002

(54) METHOD AND APPARATUS FOR ADJUSTMENT OF THE SAMPLING PHASE IN A PCM MODEM SYSTEM USING A DUAL-PHASE PROBING SIGNAL

(75) Inventors: John Pilozzi, Stow; Sepehr Mehrabanzad, Southborough; Dae-Young Kim, Lexington, all of MA (US); William Leslie Brown, Mississauga (CA)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/498,822

(22) Filed: Feb. 4, 2000

(51) Int. Cl.7 .............................. H04B 1/38; H04L 5/16
(52) U.S. Cl. ....................................... 375/222; 375/226
(58) Field of Search ................................. 375/219–222, 375/224, 226, 241, 242, 254; 370/241, 249, 252, 276, 289, 292, 516, 517, 519; 455/62, 69

(56) References Cited

U.S. PATENT DOCUMENTS

| | | | |
|---|---|---|---|
| 5,048,054 A | 9/1991 | Eynboglu et al. | 375/8 |
| 5,206,886 A | 4/1993 | Bingham | 375/97 |
| 5,228,062 A | 7/1993 | Bingham | 375/97 |
| 5,463,661 A | 10/1995 | Moran, III et al. | 375/222 |
| 5,475,711 A | 12/1995 | Betts et al. | 375/240 |

OTHER PUBLICATIONS

PCT International Search Report, PCT/US01/03332, filed Feb. 1, 2001 (3 pgs.).

*Primary Examiner*—Jean Corrielus

(57) ABSTRACT

In a PCM modem system, a method and apparatus for optimizing the fractional sampling phase offset in the upstream direction to maximize the upstream data rate utilizes a probing signal from the analog modem generated during startup and having at least two distinct phases of a pure tone, with the probing signal being detected at the digital modem where an optimum sampling phase value is calculated. From this calculated value, a signal representing the appropriate amount to delay the input data stream is transmitted back to the analog modem for adjustment of the fractional sampling phase so that the fractional sampling phase offset at the central office quantizer is optimized.

16 Claims, 4 Drawing Sheets

$T_1 > \frac{1}{2w}$ (NYQUIST INTERVAL)

$S_1(n) = A(-1)^n \cos\phi_A \quad S_2(n) = -A(-1)^n \sin\phi_B$ $\dfrac{S_2(n)}{S_1(n)} = -\tan\phi_A$ $\phi_A = \arctan\left(\dfrac{-S_1(n)}{S_2(n)}\right)$

METHOD AND APPARATUS FOR ADJUSTMENT OF THE SAMPLING PHASE IN A PCM MODEM SYSTEM USING A DUAL-PHASE PROBING SIGNAL

FIELD OF INVENTION

This invention relates to telecommunications and more particularly a method and apparatus for optimizing the sampling phase in a PCM modem system.

BACKGROUND OF THE INVENTION

In order to transmit high-speed data in the upstream direction of a Public Switched Telephone Network, PSTN, using an ITU-V. 92 like PCM modem connection it is necessary for a pre-equalizer to be employed by the analog modem transmitter to compensate for local loop channel distortion. It is known that the fractional sampling phase offset of the received symbol stream relative to the A/D quantizer at the central office, or CO, can have a significant effect on the performance of a pre-equalizer when the sampling rate is below the Nyquist rate. The effect can be large for symbol spaced pre-equalizers operating on received analog signals with significant excess bandwidth. Because the network sampling rate is fixed at 8 kHz, a digital modem operating on the network employing a PCM upstream modulation scheme would fall into this category.

For any particular equalization method and modulation scheme employed, it can be determined, either through experimentation or analysis, which fractional symbol phase offset at the analog modem will yield the best performance. Since the initial phase of the received signal is determined by the random call timing of the analog modem and the loop channel, it is desirable for digital modem to have the ability to adjust the sampling phase of its quantizer relative to the received signal.

However, the codec to which the digital modem is connected is remote from the digital modem and is not under its control. It is thus not possible for the digital modem to adjust the sampling phase of the upstream quantizer at the codec. It is therefore necessary to have a method by which the digital modem can direct the analog modem to adjust the phase of its transmitted signal such that it hits the codec at the optimum instant.

By way of further background, in the case of a typical PCM modem system there is an analog modem coupled over an analog link to a central office or CO, at which the analog signals are quantized and coupled to a digital modem. In the analog modem, a digital-to-analog converter is utilized to convert an incoming digital data stream to be transformed into an analog signal which is coupled via a hybrid circuit to a local analog loop. A node of the local analog loop is coupled to a central office which includes a codec and more importantly, a quantizer having both an analog-to-digital converter and a digital-to-analog converter, with these converters being utilized to connect the digital network to the analog loop.

As described in a paper by J. E. Mazo, entitled *Optimum Timing Phase for an Infinite Equalizer, The Bell System Technical Journal*, vol. 54, no. 1, January 1975, a system is described for optimizing the phase of a digital data stream or transmission, in which the phase refers to the phase of the samples. In this early paper, a digital equalizer is utilized to combine a sequence of the samples of the received data wave, with the equalizer being utilized to mitigate the effects of intersymbol interference and noise.

From this early work by J. E. Mazo, the phase of the sample point referenced to the sampling interval is adjusted at the receiver by adjusting the phase of the clock at the receiver which drives the analog-to-digital converter used to convert an incoming analog stream into a digital equivalent. As described in this paper, a different phase for the sampling point yields different performances for the communications system. J. E. Mazo describes how to find the optimal sampling phase and calculates the optimal sampling phase by looking at the entire frequency spectrum.

While such an optimization technique is useful when one has control of the analog-to-digital converter at the receiver, and more importantly the clock driving the A/D converter, in a PCM modem system the analog-to-digital converter is located at the central office or CO. It will be appreciated that the CO is quite far removed from the digital modem, which is the ultimate termination point for the transmission from the analog-to-digital converter. There is thus no ability to be able to remotely set the clock frequency and phase of the clock at the CO, thereby precluding the opportunity to utilize the J. E. Mazo optimization system for optimizing channel performance.

What will be apparent is that there is a requirement in PCM modem systems to be able either to adjust the frequency and phase of the clock at the CO in order to improve performance, or to be able to adjust the sampling phase at the analog modem to be able to optimize the system for channel interference and noise.

SUMMARY OF THE INVENTION

In the subject system a method is provided which allows a digital modem, during the initial training sequence, to adjust the sampling phase at the analog modem. This improves the performance of the pre-equalizer employed during data mode, which translates into lower error rates, and/or higher connect speeds.

Generally, this method can be described in the following steps. First, it is necessary for the analog modem to employ some sort of loop-back timing to lock its transmitter frequency to the network clock. After this frequency lock has been established, the digital modem can use the received quantized samples of a known dual phase analog probing signal transmitted by the analog modem to compute a phase estimate. This estimate is then compared to an optimum value and a sampling phase delay is computed which when employed at the analog modem shifts the fractional sampling phase offset to the optimum value at the CO. Note that this phase delay need only take on values between (0,1) with units of 1 symbol baud (⅛₀₀₀ sec).

The digital modem encodes the required delay in the same manner it transmits other parameters to the analog modem during training. After transmission of the required delay by the digital modem and decoding of this delay by the analog modem, the analog modem delays the input data stream by the required delay. This can be accomplished through a hardware adjustment of its codec or through software methods such as interpolation. After this adjustment, the received analog signal will hit the network codec at the central office at the phase desired by the digital modem.

Since it is necessary for the analog modem to employ some sort of loop-back timing based on the network clock, a system such as described in U.S. Pat. No. 5,199,046 by F. Ling may be used. This phase adjustment will be maintained through the entire connection. How the appropriate delay is generated is now described.

While it is desirable to be able to adjust the phase and frequency of the clock which drives the digital-to-analog converter at the analog modem, in a preferred embodiment phase delay is accomplished by an interpolation of the digital data stream ahead of the digital-to-analog converter.

What sampling phase adjustment should be employed by the interpolation requires some detection of the communications channel. In the subject invention, the optimal sampling phase delay is determined at the digital modem through the utilization of the dual phase probing signal which is transmitted from the analog modem to the digital modem. The phase difference between the two phases of the 4 kHz probing signal is set, in one embodiment, to $\pi/2$, which corresponds to ½ with units of 1 symbol baud (⅛₀₀₀ sec). Thus the second transmitted phase $\phi_2$, is determined by subtracting $\pi/2$ from the first transmitted phase, $\phi 1$. This relationship between the phases is maintained at the receiver. Therefore, the second received phase $\phi_B$ at the digital modem is the same as subtracting $\pi/2$ from the first received phase, $\phi_A$.

At the receiver, $\phi_A$ is derived as the arctan of the summation of a ratio of the received signal with the first phase to the received signal with the second phase, e.g.

$$\phi_A = \text{arctan}1/N \sum \frac{-S1(n)}{S_2(n)}$$

Note that the above equation is valid when the sampling clock is twice the probing tone and the phase difference is $\pi/2$.

In operation, the probing signal is sent in two segments, the first with the first phase and the second with the second phase. The received signal with both phases are collected and used by the phase detector to detect $\phi_A$. The first and second segments of the probing signal in one embodiment are sampled at the 8 kHz network clock rate.

With the sampling rate being 8 kHz, the probing signal in one embodiment is set to 4 kHz. The received phase at the codec of the probing signal $\phi_A$ is detected at the digital modem and the optimal sampling phase is calculated. The optimal sampling phase is that which results in a fractional sampling phase offset of zero or $\pi$ at the CO. This results in a maximum amplitude of the 4 kHz tone and thus optimum performance of the system.

Thus in one embodiment, the analog modem transmitter first sends a 4 kHz tone with phase $\phi_1$ followed by a second transmission with phase $\phi_2$, where $\phi_2=\phi_1-\pi/2$.

The reason why the 4 kHz tone is so important is that at the receive side, or more importantly at the CO, due to the analog-to-digital converter whose sampling frequency is below Nyquist rate, the digital signal is an aliased version of the original signal.

After the analog-to-digital converter, the components or portions of the signal due to the skirts of adjacent waveforms, P1 and P2, can either add or subtract depending on the phase of the fractional sampling phase offset, and this effect is called aliasing. One achieves better performance if these two components add. By making P1 and P2 add each other constructively at 4 kHz, it is more likely P1 and P2 will add each to the other at other frequencies. The important point is to select the optimal phase offset at which these two components, P1 and P2, add.

As will be seen, by selecting the probing signal frequency to be 4 kHz and setting the phase difference of the phases of the two tone segments to be $\pi/2$, it will be shown that the ratio of the received signal with the first phase to the received signal with the second phase yields the appropriate delay to be inserted at the analog end. In one embodiment, $$\phi_A = \text{arctan}\frac{-S1(n)}{S_2(n)}$$

Since, $S_1(n)=A\cos(\pi n+\phi_A)=A(-1)^n \cos\phi_A$ and $S_2(n)=A\cos(\pi n+\phi_B)=-A(-1)^n \sin\phi_A$. To make the estimate more accurate, the ratio of s(n)s can be averaged over many samples, and this yields, $$\phi_A = \text{arctan}1/N \sum \frac{-S1(n)}{S_2(n)}$$

where N is the number of received signal samples used to estimate phase $\phi_A$.

From the detection of $\phi_A$ at the digital modem, one can calculate the optimal delay that the analog modem must insert to make the new phase of the received signal zero or $\pi$, which is optimal. By inserting the appropriate delay, one sets the sampling phase at the analog side such that the two components P1 and P2 add as opposed to subtract, which in turn yields optimal performance. From the above equations, and assuming the transmitter is currently transmitting at the $\phi_2$ phase, it can be shown that, the optimal delay D=(2$\pi$-$\phi_B$)/(2$\pi$) mod 1==(2$\pi$+/2-$\phi_A$)/(2$\pi$)mod 1.

In summary, in a PCM modem system, a method and apparatus for optimizing the fractional sampling phase offset to maximize the upstream data rate utilizes a probing signal from the analog modem generated during startup and having two or more distinct phases, with the probing signal being detected at the digital modem where an optimum sampling phase is calculated. Thereafter an optimal delay is calculated and is transmitted back to the analog modem where incoming data symbols are delayed by this amount. This makes the fractional sampling phase offset to be optimal at the central office quantizer.

More particularly, during startup the optimal sampling phase is determined by transmitting a probing signal having two different phases of a known phase difference and determining from the ratio of the two received signals the optimal sampling phase. The optimal sampling phase delay in one embodiment is the arctan of the ratio of the two received probing signal segments. The arctan is calculated from measuring the received segments and is utilized to specify the optimal sampling phase delay correction to be transmitted back to the analog modem.

Utilization of the two-phase 4 kHz tone permits one to assure that the components at the sampling point will be additive given the insertion of the correct sampling phase delay. Since additive, the calculated sampling phase delay, when applied at the analog modem, will make the fractional sampling phase offset optimal when the transmitted signals arrive at the central office. This yields a maximum amplitude of the 4 kHz tone, thus indicating that the system has been set for optimal performance.

BRIEF DESCRIPTION OF THE DRAWINGS

These and other features of the subject invention will be better understood in connection with the Detailed Description in conjunction with the Drawings; of which.

DETAILED DESCRIPTION

Figure 1:
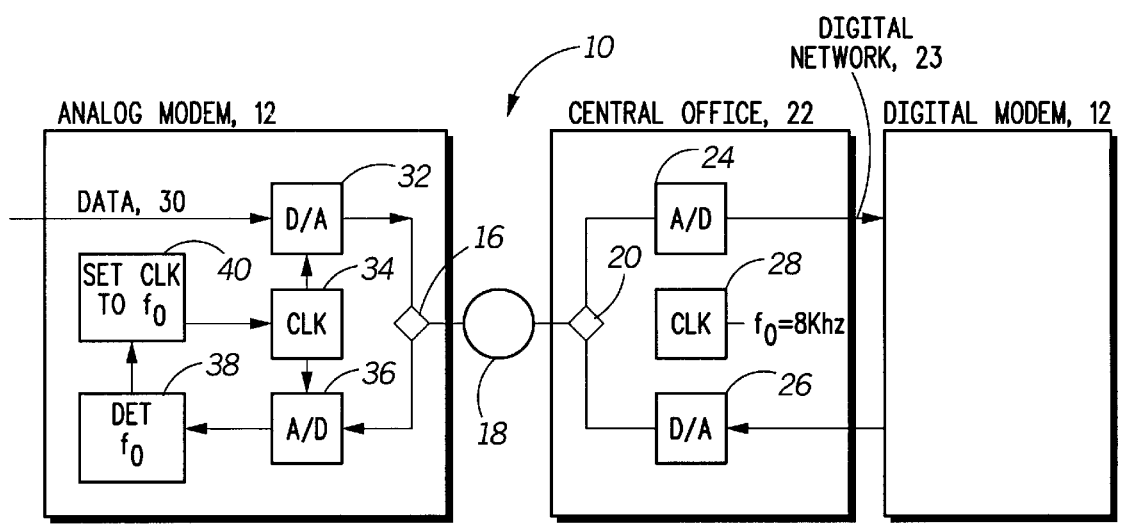
FIG. 1 is a block diagram of a typical PCM modem system in which the clock at the central office is locked to the network clock of 8 kHz and in which the clock at the analog modem is likewise locked to the network clock, in which the sampling phase offset of the signal at the central office quantizer has a direct effect on upstream data speed.

Referring now to FIG. 1, a typical PCM modem system 10 includes an analog modem 12 and a digital modem 14. In the upstream direction, the analog modem is coupled via hybrid circuit 16 to a local analog loop 18, which is in turn connected through a hybrid circuit 20 in central office 22 to an analog-to-digital converter 24, in turn coupled to digital modem 14. Also at the central office is a digital-to-analog converter 26 in the downstream path, with a clock 28 utilized by both the analog-to-digital converter and the digital-to-analog converter. It will be appreciated that analog-to-digital converter 24 functions as a quantizer. Note that clock 28 is set at $f_o$=8 kHz which is the network timing frequency.

The digital data 30 is generated by a pre-equalizer system. Analog modem 12 converts digital data 30 to an analog stream through the utilization of a digital-to-analog converter 32. Digital-to-analog converter 32 is clocked via clock 34 within the analog modem, which is locked to network timing such that $f_0$ is set to 8 kHz through loop-back timing technology. Network timing is detected at the analog modem through the utilization of analog-to-digital converter 36 and/or a downstream receiver coupled to a timing detector 38 which is utilized at unit 40 to lock clock 34 to network timing.

While such a PCM modem system operates satisfactorily when the sampling rate of digital data 30 is above the Nyquist rate, when the rate of data 30 and therefore D/A converter 32 rate is below the Nyquist rate, such as 8 kHz, to reduce the complexity of the modem transmitter, modem speed must be reduced for robust communications. The lost data is in part due to varying channel characteristics depending on the sampling phases.

As described in the above-mentioned paper by J. E. Mazo, a system can be devised for optimizing the phase of a digital data stream or transmission, in which the phase refers to the phase of the samples. In the system envisioned by J. E. Mazo, a transmitter 40 accepts a digital data stream which is converted by a digital-to-analog converter 42 and coupled via a channel 46 to a receiver 48.

Receiver 48 utilizes an analog-to-digital converter 50 coupled to channel 46 to convert the incoming analog signal to a digital signal, with the output of A/D converter 50 connected to an equalizer 52 and thence to a threshold device 54, with the output of the threshold device being the recovered digital data stream.

As will be appreciated, the sampling provided by analog-to-digital converter 50 is controlled by a clock 56 to adjust sampling phase offset as illustrated at 58 so as to provide optimal performance for the system. According to the above-mentioned paper, the entire frequency spectrum is analyzed and an optimal phase offset adjustment is made at 58 to adjust clock 56.

Figure 2A:
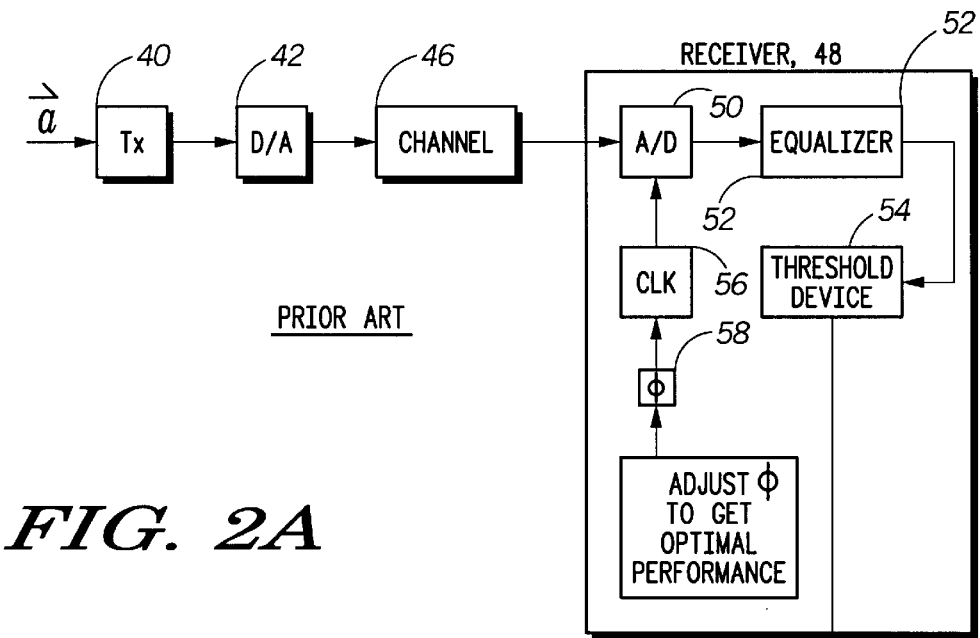
FIG. 2A is a block diagram of a scenario in which digital data at the transmit side is sampled and converted to an analog signal transmitted through a communications channel to a receiver having an analog-to-digital converter, in which the phase of the clock utilized for the analog-to-digital converter is adjusted in an optimal manner to provide for optimum sampling of the received analog signal.
Figure 2B:
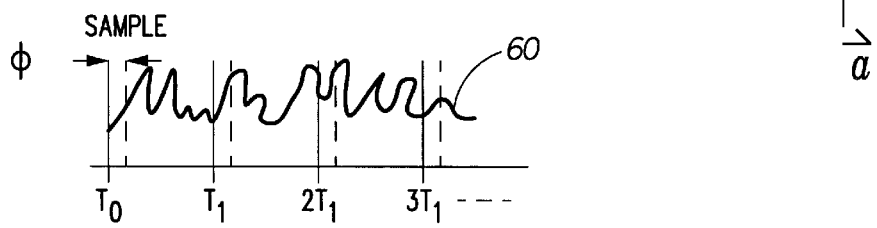
FIG. 2B is a waveform diagram illustrating the fractional sampling phase offset of the analog signal which arrives at the receiver of FIG. 2A.
Figure 3:
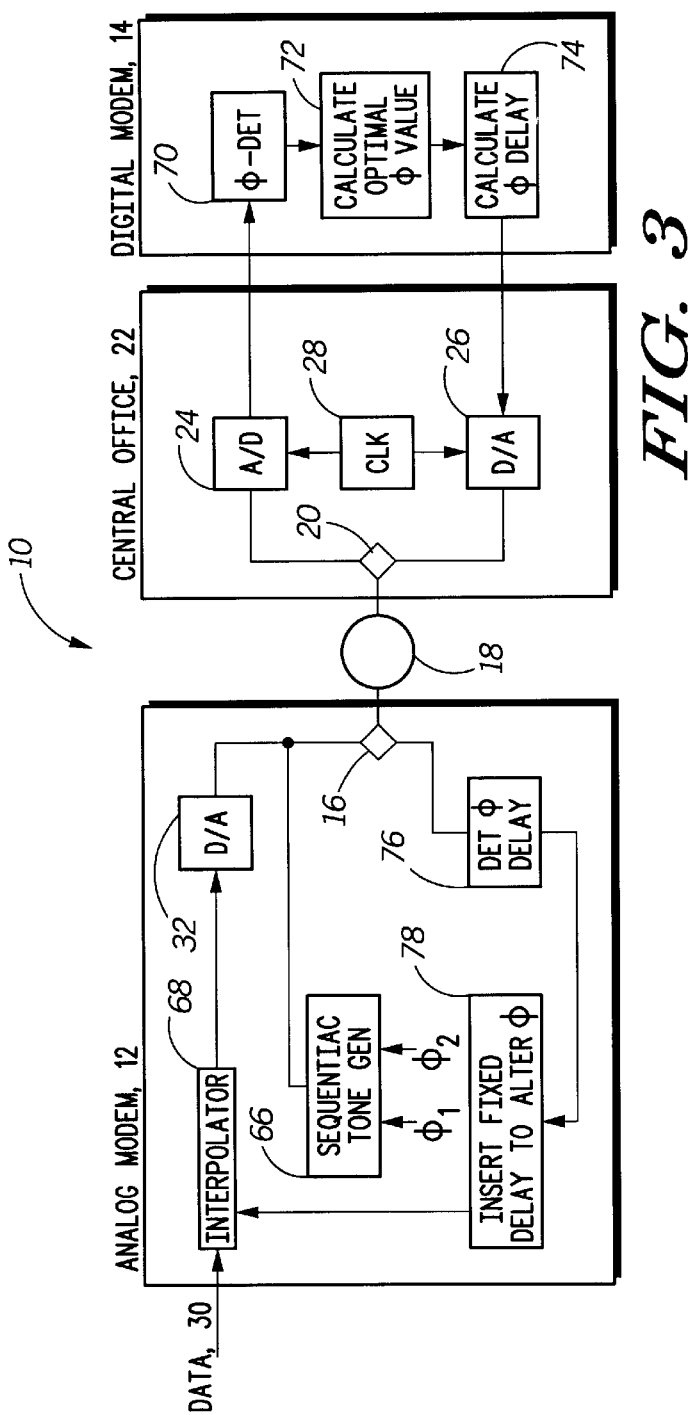
FIG. 3 is a block diagram of the subject system illustrating the transmission of a pure probing tone to permit calculating the delay to be transmitted back to the analog modem for delaying the incoming data stream to alter the sampling phase such that the sampling phase offset at the central office is optimum.

Referring now to FIG. 2B, analog waveform 60 is sampled at time $T_1, 2T_1, 3T_1.$, with the sampling interval $T_1$, being greater than the Nyquist interval which is defined as the inverse of Nyquist frequency. Note that by definition, sample phase $\phi$ is the difference in time between 0 and the leading edge of the actual sample pulse. Since the sampling rate in the subject case is below the Nyquist rate, the sampling phase is critical.

As described hereinbefore, the scheme suggested in FIG. 2A is impractical because the digital modem does not have control of the central office analog-to-digital converter that is part of the quantizer because it is remote from the central office. The problem therefore becomes how the sampling phase offset can be adjusted.

In order to be able to provide an optimal sampling phase offset for the analog signals arriving at the central office, in the subject system a probing signal is generated by the analog modem. This probing signal in one embodiment is a pure 4 kHz tone that has two segments. The phase shift between the two segments in one embodiment is $\pi/2$. This dual-phase signal is generated at 66 in the analog modem, with the tone injected between digital-to-analog converter 32 and hybrid circuit 16.

It is the dual-phase probing signal that is utilized at the digital modem to be able to calculate a phase delay which is to be inserted into data stream 30 by an interpolator 68 such that the signals arriving at the central office with an optimal fractional phase offset of zero or $\pi$.

In essence what is accomplished through the delay of the data stream ahead of analog-to-digital converter 32 is to simulate a change in the phase of clock 28 at the central office which would optimize quantizer sampling.

Note that in one operational embodiment, the probing signal is utilized in the training phase of the PCM modem system and is transmitted at least initially during the startup mode. The incoming probing signal is converted from its analog format to a digital format and is coupled to a phase detector 70 which resides at the digital modem. The detected phase of one of the segments of the dual-phase probing signal is utilized at 72 to calculate an optimal sampling phase value, which in turn is used at 74 to calculate the appropriate delay. This delay is the delay which is to be inserted into data stream 30 to correct for channel variations by providing an optimal sampling phase offset in the upstream direction.

The delay transmitted from the digital modem is detected at 76 at the analog modem, with unit 78 driving interpolator 68 to insert a fixed delay to alter the sampling phase by the amount specified at the digital modem. In so doing, the fractional sampling phase offset for analog signals arriving at the central office is adjusted to zero or π, thereby optimizing the system.

Figure 4B:
FIG. 4B is a waveform diagram illustrating the segmented probing signal.
Figure 4A:
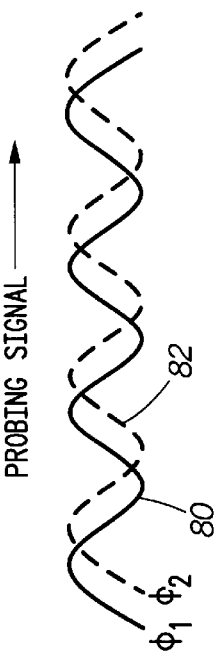
FIG. 4A is a waveform diagram of the two segments of the probing signal illustrating a $\pi/2$ phase shift between the two.

As to the probing signal, and as illustrated at FIG. 4A, waveforms 80 and 82 represent $\phi_1$ and $\phi_2$ which are offset by π/2. As illustrated in FIG. 4B, waveform 80, which has a phase of $\phi_1$ is transmitted sequentially before waveform 82 which has a phase of $\phi2$.

Figure 5A:
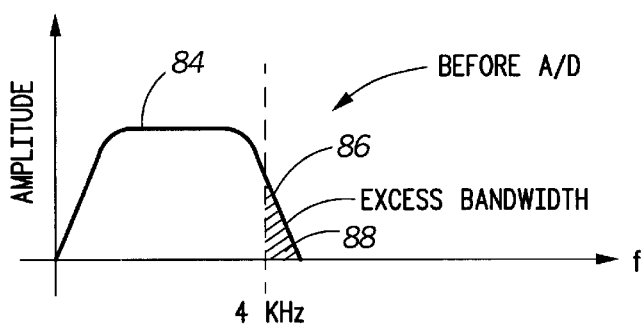
FIG. 5A is a graph of amplitude vs frequency for the analog signal arriving at the central office, illustrating excess bandwidth.

In one embodiment, the probing signal is a pure 4 kHz tone, the importance of which has to do with aliasing occasioned by sampling below the Nyquist rate and is as follows:

Referring now to FIG. 5A, waveform 84 represents the received tone prior to analog-to-digital conversion at the central office. A portion 86 of waveform 84 extends beyond the 4 kHz frequency point, with portion 86 forming a skirt indicating by shaded area 88 what is known as excess bandwidth. Given the 8 kHz sampling rate, the 4 kHz tone results in an excess bandwidth which is relatively small.

Figure 5B:
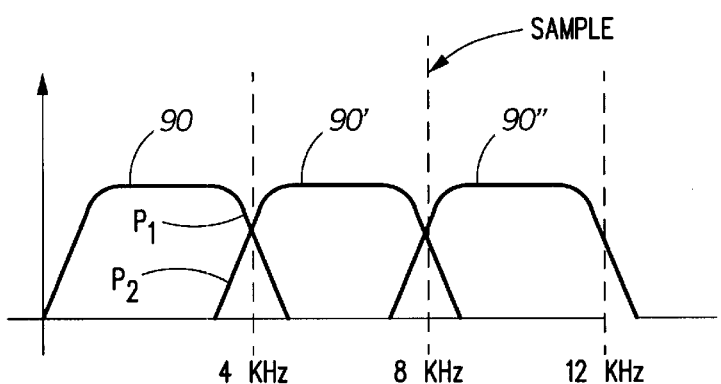
FIG. 5B is a graph of amplitude vs frequency of the sampled analog signal at the central office illustrating aliasing.

Referring now to FIG. 5B, waveforms 90, 90 and 90 are the result of the analog-to-digital conversion in which components or portions $P_1$ and $P_2$ exist due to aliasing. It will be appreciated that better performance is achieved if these components are additive. After the analog-to-digital converter, the components or portions of the signal due to the skirts of adjacent waveforms, P1 and P2, can either add or subtract depending on the phase of the fractional sampling phase offset, and this effect is called aliasing. One achieves better performance if these two components add. By making P1 and P2 add each other constructively at 4 kHz, it is more likely P1 and P2 will add each to the other at other frequencies. The important point is to select the optimal phase offset at which these two components, P1 and P2, add.

In order to do this, the phase of the two segments of the 4 kHz tone is detected at the digital modem. Having detected the phase of the probing signal at the digital modem, it is possible to calculate the sampling phase offset that will give the optimal sampling phase offset at the central office and thus the maximum amplitude of the 4 kHz tone, the reason for the improved performance.

Figure 6:
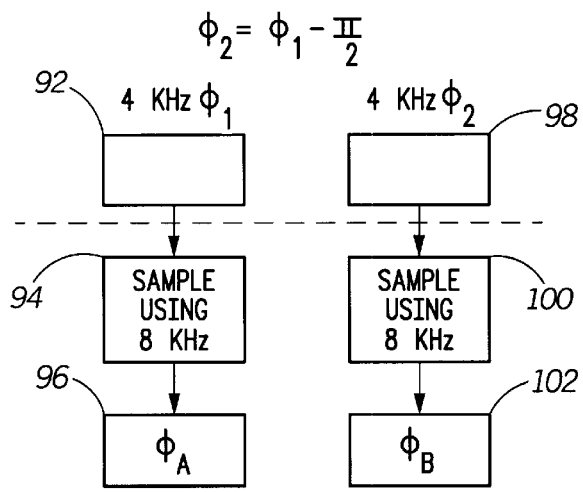
FIG. 6 is a diagrammatic representation of the detection of the phase of the two segments of the probing signal, with the detected phase one of the segmented probing signals providing for calculation of the delay to be inserted to adjust the sample phase offset; and, FIG. 7 is a diagrammatic representation of another embodiment of the subject invention.

Referring now to FIG. 6, the first $\phi_1$ segment of the probing signal, here illustrated at 92, is detected. This segment is sampled at 8 kHz as illustrated at 94, which yields a detected phase of $\phi_A$ at 96. Likewise the second of the segments of the probing signal 98 having a phase $\phi_2$ is sampled at 100 to yield the detected phase of the second sample, namely $\phi_B$ as illustrated at 102. As can be seen from the formulas in FIG. 6, the detected phase $\phi_A$ is such that:

$$\phi_A = \arctan \frac{-S1(n)}{S_2(n)}$$

From $\phi_A$ one can calculate the optimal delay that the analog modem must insert to make $\phi_B$ equal to zero, assuming the transmitter is currently at the $\phi2$. In so doing, one inserts a delay such that the fractional sampling offset is either zero or π. The inserted delay, D, in the illustrated embodiment is $(2\pi+\pi/2-\phi_A)/(2\pi)$ mod 1.

Figure 7:
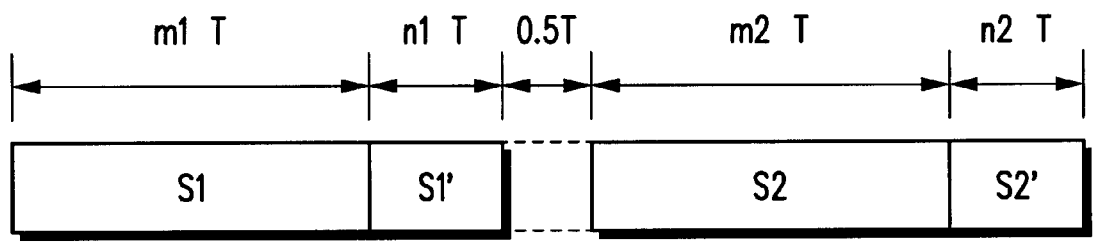

FIG. 7 shows an example of a probing signal that has two different phases in 4 kHz. The signals S1 and S2 are a repetition of {A 0 A −A 0 −A}, where A is chosen to meet a certain power constraint. The probing signal consists of two frequency terms: 1.3 kHz and 4 kHz. The 1.3 kHz tone is not used to find optimal phase, but it is to sustain a certain power at the receiver even though there is a deep null at 4 kHz at the channel response. S1' is added to let the receiver detect the boundary between one phase and another, i.e. between S1 and S2. Note that there is a 0.5T gap between S1' and S2 to give a π/2 phase difference between S1 and S2. This can really be a gap that does not have any signal component; or S1' could be extended to cover the gap. At the receiver, the 4 kHz component of S1 and S2 is used to detect optimal phase. Note that to make the calculations more accurate S1' and S2' can also be used together with S1 and S2. Note also that 1.3 kHz component can be easily filtered out at the receiver, so that only the 4 kHz tone is used to calculate optimal phase.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. In a PCM modem system including an analog modem to which an input data stream is coupled, with the analog modem coupled to a digital modem through an analog loop and a central office, a method for optimizing a fractional sampling phase offset in an upstream direction from the analog modem to the digital modem to maximize the upstream data rate, comprising the steps of:

generating a probing signal having at least two distinct phases of a pure tone;

transmitting the probing signal in the upstream direction;

measuring at least one of the phases of the probing signal;

transmitting back to the analog modem a signal representing an amount to delay the input data stream, with the delay derived from the measuring the phase of at least one of the phases of the probing signal and being necessary to provide an optimal phase offset at the central office; and, delaying the input data stream by the derived delay.

2. The method of claim 1, wherein the optimal fractional phase offset at the central office is zero or π.

3. The method of claim 1, wherein the delay is that which causes aliasing components to add.

4. The method of claim 3, wherein a quantizer is used at the central office, wherein a clock driving the quantizer is set to 8 kHz, and wherein the frequency of the probing signal is set to half the clock frequency and wherein the phase difference between the phases of the probing signal is π/2.

5. The method of claim 1, wherein the phase of the probing signal is sensed at the digital modem.

6. The method of claim 1, wherein the PCM modem system is initialized during a startup mode and wherein the probing signal is transmitted during the startup mode.

7. The method of claim 6, wherein the PCM modem system has a network clock, wherein the analog modem employs loop-back timing to lock a transmitter thereof to the network clock and wherein the probing signal is transmitted after loop-back timing lock.

8. The method of claim 1, wherein the delay is implemented at the analog modem by hardware adjustment of a clock driving a digital-to-analog converter used to convert the input data stream to an analog signal.

9. The method of claim 1, wherein the delay is implemented at the analog modem by interpolation of the input data stream.

10. The method of claim 1, wherein the probing signal is sent in at least two segments, with each segment having a different phase.

11. The method of claim 10, wherein the phase of the probing signal is detected by a phase detector which collects the two probing signal segments and outputs the detected phase of one of the detected probing signal segments.

12. The method of claim 1, wherein an analog-to-digital converter of a quantizer at the central office has a sampling frequency below the Nyquist rate which results in a digital signal which is an aliased version of the original signal.

13. In a PCM modem system, a method for optimizing a fractional phase offset of a signal in an upstream direction from an analog modem to a digital modem in which there is no ability to control a sampling clock used for an analog-to-digital converter in the upstream direction in a quantizer between the analog modem and the digital modem, comprising the steps of:

sending a multiphase probing signal from the analog modem to the digital modem;

detecting one of the phases of the multiphase probing signal at the digital modem;

deriving from the detected phase an adjustment to be applied at the analog modem to adjust the signal transmitted therefrom such that the fractional phase offset at the analog-to-digital converter is optimum, whereby the upstream data rate is optimized.

14. The method of claim 13, wherein an input data stream is applied to the analog modem and wherein the adjustment at the analog modem includes delaying the input data stream by an amount which optimizes the fractional phase offset.

15. The method of claim 14, wherein the probing signal includes a pure tone sent in segments each having a different phase and in which the phase difference of the phases of the multiphase probing signal is $\pi$.

16. The method of claim 15, wherein the PCM modem system has a network clock, wherein the sampling clock of the quantizer is set to the network clock frequency and wherein the frequency of the probing signal is half of the network clock frequency.

* * * * *